Dec. 27, 1938.　　　　H. S. JANDUS　　　　2,141,302
TIRE COVER LOCK
Original Filed Nov. 26, 1930　　2 Sheets—Sheet 1
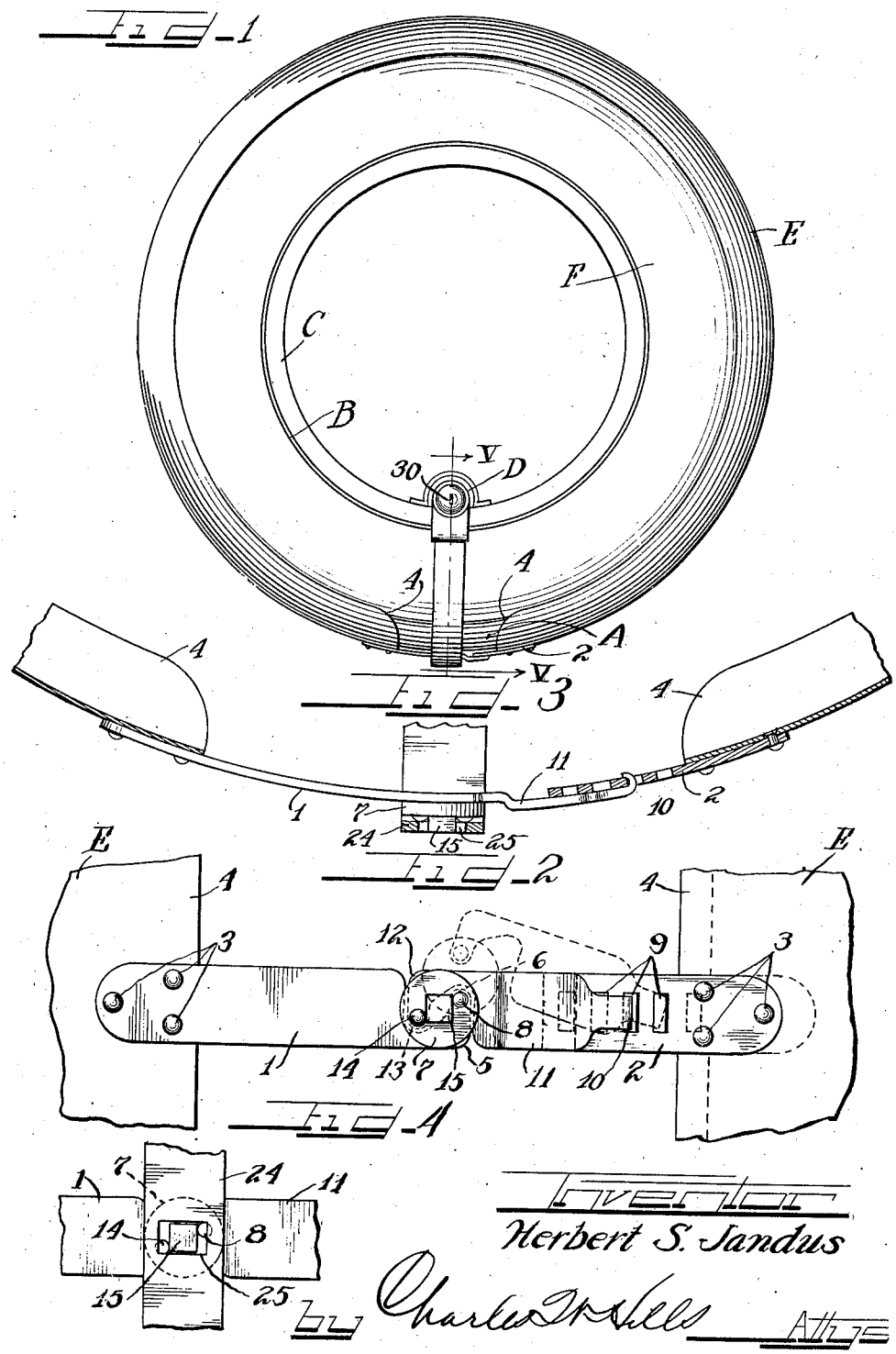
Inventor
Herbert S. Jandus
by Charles T. Sells
Attys

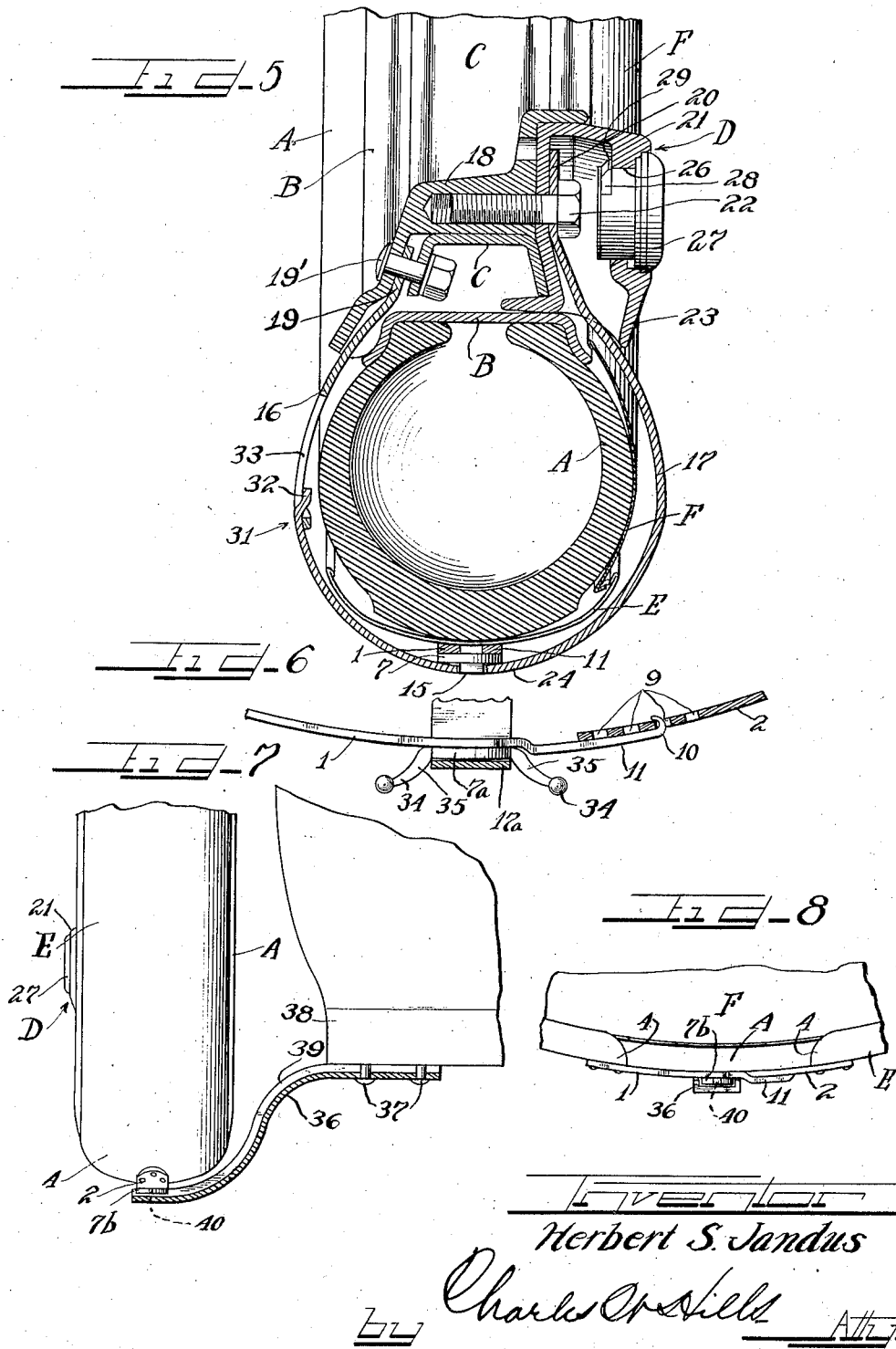

Patented Dec. 27, 1938

2,141,302

UNITED STATES PATENT OFFICE 2,141,302

TIRE COVER LOCK

Herbert S. Jandus, Detroit, Mich., assignor, by mesne assignments, to Houdaille-Hershey Corporation, Detroit, Mich., a corporation of Michigan Application November 26, 1930, Serial No. 498,215
Renewed September 13, 1934

7 Claims. (Cl. 150—54)

This invention has to do with locking devices and contemplates as its essential object the provision of means for locking a tire cover against unauthorized removal from a motor vehicle or the like.

A further object of the invention involves the provision of means for locking a spare wheel, tire and tire cover against unauthorized removal from the car.

Another object of the invention consists in providing tire locking instrumentalities which will discourage theft as long as the tire and wheel on which the cover is mounted is locked on the tire carrier.

It is realized that attempts have been made in the past to lock a spare wheel, tire and tire cover on a carrier. These attempts have been attended with an indifferent amount of success, due to a substantial extent to the complexity of the means employed. The present invention, on the other hand, derives considerable merit by reason of its simplicity and in having the advantages of ease of assembly and disassembly. Moreover, its constituent parts are easy and cheap of manufacture and the whole has a very presentable appearance. A further feature in favor of the present construction lies in the simplicity of the cover itself.

The type of cover intended to be locked by my invention is primarily one including a member adapted to partially encircle the tread of a tire. The ends of the member are relatively movable, and the locking device is provided with means adapted to limit separation of said ends and thereby prevent removal of the cover from the tire. This member may, therefore, be of a resilient nature serving to maintain itself in tight engagement with the tire, or of the articulated type, or may be flexible and non-resilient, and may or may not be accompanied by a substantially annular side plate engageable with the side wall of the tire and a marginal portion of said member.

In a preferred form of locking device, the same embodies a toggle construction, and means are incorporated therein for operating this construction to permit separation of the ends of the tire cover. Access to such means by unauthorized persons may be prevented by suitable means attached permanently to the vehicle body, either directly or indirectly, as by being secured to the spare tire carrier, or, if desired, by the usual lock for the spare wheel, such lock being modified to cooperate with the toggle construction to prevent unauthorized access thereto.

Other and further important objects and advantages of this invention will be apparent from the disclosures in the specification and the accompanying drawings.

This invention (in a preferred form) is illustrated in the drawings and hereinafter more fully described.

As shown on the drawings:

Figure 1 is an elevational view of one form of the invention.

Figure 2 is an enlarged fragmentary bottom plan view showing the improved toggle locking means for the ends of a tire cover, the dotted lines showing the parts in open or released position.

Figure 3 is a fragmentary transverse sectional view of the construction shown in Figure 2, certain parts being shown in elevation.

Figure 4 is a fragmentary bottom plan view similar to that shown in Figure 2, but including means for preventing unauthorized operation of the toggle instrumentalities.

Figure 5 is an enlarged fragmentary sectional view taken approximately in the plane indicated by the line V—V in Figure 1, said parts being shown in elevation.

Figure 6 is a view similar to Figure 3, but showing a modified form of the invention.

Figure 7 is a fragmentary elevational view, partly in section, showing a still further form of the invention.

Figure 8 is a fragmentary elevational view, looking to the right, of the construction shown in Figure 7.

Referring now more particularly to the drawings, wherein the same parts are indicated in each case by the same reference characters, the tire A is shown on a rim or wheel B, the same being mounted upon a tire carrier C, which in turn is permanently secured in any suitable manner to the rear of an automobile. The lock D, essentially of well-known construction although any suitable locking instrumentalities may be substituted therefor, is employed for securing the wheel and tire to the carrier C. With the ring type of carrier as illustrated at C, it will be understood that suitable lugs, not shown, will be employed for cooperation between certain parts of the rim and cooperating parts of the carrier so that the lock D will be effective.

Instrumentalities provided in accordance with the present invention for locking the tire cover comprising a split ring E, alone, or combined with an annular side plate F, to a tire, consists essentially of a toggle structure directly connecting the ends of the ring E and a device for preventing access to the toggle structure for manipulating the latter.

The toggle structure referred to comprises a pair of straps 1, 2, attached by rivets, spot welding or the like 3 to the ends 4 of the ring E. The free end 5 of the strap 1 is in the form of a hook, to whose extremity 6, a toggle actuating element 7 is pivotally connected as shown at 8. The strap 2 is provided with a series of openings 9 adapted to loosely receive the hook 10 of a link 11. This looseness permits of a certain degree of substantially pivotal movement of the link 11 relative to the strap 2 as indicated in dotted lines in Figure 2, and of the easy insertion and removal of the hook 10, the purpose of which will appear as the description proceeds. The end of the link 11 opposite strap on which the hook 10 is located is in the form of a hook 12 substantially identical with the hook 5 of the strap 1, the extremity 13 of the hook 12 being likewise pivotally connected at 14 to the actuating element 7. It will be noted that the pivotal connections 8 and 14, when the straps 1 and 2 and the link 11 are in substantial alinement, are located on opposite sides of the longitudinal line passing centrally through said straps and link, and thus it will be appreciated that a toggle effect is provided.

The openings 9 will, of course, be positioned to provide for a proper adjustment of the parts and, in view of the resilience of the rubber of which the tire is made, a certain pressure will be exerted at all times when the parts are arranged as shown in Figure 2 to prevent release of the toggle instrumentalities. Upon release of these instrumentalities, as by rotation of the actuating element 7, the ends 4 of the cover member E will spread under the influence of the pressure of the tire, so that the link 11 will be sufficiently loose to permit withdrawal of the hook 10 from its opening 9, whereupon the tire cover may be removed. For convenience in manipulating the actuating element 7, the latter is provided with a polygonal projection 15, although it will be appreciated that any other suitable means may be employed in this connection, as for example, a non-circular slot located in the member 7 or the latter member itself may be non-circular for this purpose.

For the purpose of theft prevention, it is desirable to prevent access to the manipulating portion of the actuating member 7. In accordance with one form of the invention, therefore, a band consisting of the straps 16 and 17 is provided. One end 19 of the strap 16 is preferably permanently secured to the carrier C and the jaw 18 of the lock D at 19', and the corresponding end 20 of the strap 17 is secured to the jaw 21 by means of the bolt 22 passing loosely through said jaw and the end 20 and threadedly connected to the jaw 18. The skirt 23 of the jaw 21 is disposed closely adjacent the strap 17 and is out of contact with the side plate F of the tire cover, thereby avoiding marring of said plate and preventing insertion of a tool by an unauthorized person to actuate the bolt 22.

The portion 24 of the strap 17 is provided with an opening 25 adapted to receive the polygonal projection 15 of the actuating member 7. It will be noted that the opening 25 is of greater dimensions than the projection 15 to provide clearance so that no difficulty will be encountered when it is desired to pass the strap 17 under the tire A in such position that the opening 25 will receive the projection 15. It will be noted further that the opening 25 is substantially longer than the corresponding dimension of the projection 15, thereby allowing for the positioning of the outer ring E of the tire cover within a substantial range circumferentially of the tire without disturbing the efficacy of the locking means. It will accordingly be appreciated that, once the projection 15 is received in the opening 25 as shown in Figures 3, 4 and 5, and the parts arranged substantially as shown in Figure 5, it is impossible to remove the wheel, tire and/or tire cover.

In order to prevent unauthorized actuation of the bolt 22, the jaw 21 is provided with an opening 26 in substantial alinement with the bolt 22, to receive the lock face 27. The latter is of any suitable construction provided with plungers 28 which are preferably spring pressed and which when the lock face is in locked position, are adapted to engage the interior wall 29 of the jaw 21 and thereby prevent unauthorized removal of the lock face 27. When it is desired to remove the latter, it is necessary to insert the proper key in the lock face opening 30 whereupon the plungers 28 will be retracted to permit removal of the lock. Once the lock face is removed, a suitable socket wrench or the like may be inserted in the opening 26 to engage with the head of the bolt 22 to actuate the latter.

When it is desired to place the strap 17 in inoperative position and to remove the tire cover alone, or, if desired, the rim B and the tire A, after removal of the lock face 27 and the bolt 22, the jaw 21 is removed entirely from receiving position relative to the extension 20 of the strap 17, and the latter is swung downwardly and rearwardly about the detachable hinge connection with the strap 16 at 31. This connection consists of a T-head 32 offset from the body portion of the strap 17 and adapted to be inserted through the slot 33 in the strap 16 and thence turned at right angles until it occupies the position shown in Figure 5.

In a somewhat modified form of the invention, shown in Figure 6, the toggle actuating element 7a may be provided with handles 34, extending downwardly therefrom, and the strap 17a is preferably, though not necessarily, unperforated and fits between the upper portions 35 of the handles 34. It will thus be apparent that the edges of the strap 17a will engage or be disposed adjacent and between the upper portions 35 of the handles 34 to thereby prevent actuation of the latter, so that when the parts are positioned as shown in Figure 6, with the lock instrumentalities in position as shown in the upper part of Figure 5, it is impossible to actuate the toggle mechanism. However, upon removal of the strap 17a from the position shown, the actuating member 7a is free to be operated to separate the parts of the toggle mechanism, whereupon the outer ring E of the tire cover is free to be removed.

While the invention is shown as used in connection with a tire mounted on a rim which in turn is mounted on a ring type of carrier, it will be appreciated that the invention is susceptible of use in connection with any form of lock and any form of wheel structure, as for example wood spoke, wire and disc wheels. It is accordingly to be understood that the foregoing description is to be considered merely exemplary and in no way limiting the breadth of the invention.

In a still further form of the invention, the straps employed in the constructions above set forth are discarded in favor of a single bar or strap which will serve effectively to prevent unauthorized actuation of the toggle mechanism and thereby prevent removal of the tire cover. To this end, a strap or bar 36, preferably channel shaped in cross section, is riveted or otherwise permanently secured at 37 to the body 38 of the vehicle, the flanges 39 being preferably uppermost, and extends rearwardly to receive the actuating member 7b of the toggle mechanism. The metal of the strap is made sufficiently thick and strong to discourage attempts to distort or otherwise make the same ineffective by the use of a tool or other device as a lever or in any other common manner. When it is desired to place the actuating member 7b in its locked position, it is necessary merely to position the same in substantial alinement with the channel of the bar 36 and then move the wheel, tire and tire cover axially toward the tire carrier and vehicle until the parts are in position as shown in Figures 7 and 8.

The locking instrumentalities for securing the wheel and tire to the carrier, while independent of the bar 36, will nevertheless serve to prevent unauthorized actuation of the toggle instrumentalities, due to the fact that it is impossible to do the same until the tire and wheel are removed from the carrier since, until this is done, the actuating element 7b will be disposed between the flanges 39 of the channel bar 36. Once the actuating element 7b is removed, the same may be actuated by the insertion of a screw driver or the like in the slot 40, or, if desired, the actuating element 7b may be made non-circular or otherwise to receive a wrench.

It will be seen from the foregoing that, whether a band or simply a bar attached to the vehicle be employed to prevent unauthorized access to the toggle mechanism, an extremely simple and efficacious locking device is provided. It will, moreover, be noted that the hook portion 10, upon release of the toggle mechanism, may be slipped out of the slot or opening 9 with which it has been associated so that removal of the outer ring E is then a matter of a few moments.

I am aware that many changes may be made and numerous details of construction may be varied through a wide range without departing from the principles of this invention, and, I, therefore, do not purpose limiting the patent granted hereon otherwise than necessitated by the prior art.

I claim as my invention:

1. In a device of the class described, a tire carrier, a tired wheel mounted thereon, means for locking said wheel on said carrier, a band cooperating with said lock to substantially transversely encircle said tire, a tire cover mounted on said tire and encircling a major portion of the periphery of said tire, and toggle mechanism connecting the ends of said cover and maintaining the same in tight engagement with the tire, whereby said tire exerts a pressure on said ends to maintain the toggle mechanism in operative position, said toggle mechanism including a manipulating portion, said band and manipulating portion having interlocking means whereby actuation of said toggle mechanism is prevented.

2. In a device of the class described, a tire carrier, a tired wheel mounted thereon, means for locking said wheel on said carrier, a band cooperating with said lock to substantially transversely encircle said tire, a tire cover mounted on said tire and encircling a major portion of the periphery of said tire, and toggle mechanism connecting the ends of said cover and maintaining the same in tight engagement with the tire, whereby said tire exerts a pressure on said ends to maintain the toggle mechanism in operative position, said toggle mechanism including a manipulating portion, said band and manipulating portion having interlocking means whereby actuation of said toggle mechanism is prevented, and means for preventing disturbance of said interlocking means.

3. In a device of the class described, a tire carrier, a tired wheel mounted thereon, means for locking said wheel on said carrier, a band cooperating with said lock to substantially transversely encircle said tire, a tire cover mounted on said tire and encircling a major portion of the periphery of said tire, and toggle mechanism connecting the ends of said cover and maintaining the same in tight engagement with the tire, whereby said tire exerts a pressure on said ends to maintain the toggle mechanism in operative position, said toggle mechanism including a manipulating portion, said band and manipulating portion having interlocking means whereby actuation of said toggle mechanism is prevented, and means for preventing disturbance of said interlocking means, the last named means serving also to prevent separation of said interlocking means.

4. In combination with a tire and an automobile having a tire carrier on which the tire is locked, a tire cover comprising a split ring like member covering a major portion of the periphery of the tire, toggle mechanism for connecting the ends of said member and including an actuating member, and means permanently connected to the automobile and cooperating with said actuating member for preventing unauthorized access thereto.

5. An automobile spare tire cover comprising a split arcuate ring for disposition about substantially more than one-half of the outer periphery of the tire, said ring having a gap between its ends and connecting mechanism between said ends and bridging said gap and including means for drawing the ends of the ring toward each other and for forcing said mechanism into tight engagement with a portion of the tire tread exposed at said gap.

6. An automobile spare tire cover comprising a split arcuate ring for disposition about substantially more than one-half of the outer periphery of the tire, said ring having a gap between its ends and connecting mechanism between said ends and bridging said gap and including means for drawing the ends of the ring toward each other and for forcing said mechanism into tight engagement with a portion of the tire tread exposed at said gap, said mechanism and means embodying a manually operable toggle disposed to exert pressure against the resilience of the tire when the toggle is in its closed and engaged position.

7. As an article of manufacture, a spare tire cover including a side plate and a split tread covering band for connection to said side plate over the tread of the tire, said split band having its ends connected by a toggle lever for drawing the ends of said band together to secure the band to said side plate and to hold the resulting tire cover on the tire, and means for locking said toggle against operation after said cover is in position on the tire and for locking the spare tire and cover to an automobile.

HERBERT S. JANDUS.